US006997211B2

(12) United States Patent
Alman et al.

(10) Patent No.: US 6,997,211 B2
(45) Date of Patent: Feb. 14, 2006

(54) MULTIPLE MATERIAL VALVE PLUG FOR HIGH TEMPERATURE OPERATION

(75) Inventors: Paul T. Alman, Marshalltown, IA (US); Kimball R. Barron, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 141 days.

(21) Appl. No.: 10/613,300

(22) Filed: Jul. 3, 2003

(65) Prior Publication Data

US 2005/0000577 A1    Jan. 6, 2005

(51) Int. Cl.
    *F16K 11/04*   (2006.01)
(52) U.S. Cl. .............................. 137/625.33; 137/625.37
(58) Field of Classification Search ............. 137/625.3, 137/625.33, 625.37, 625.38, 625.39
    See application file for complete search history.

(56) References Cited

U.S. PATENT DOCUMENTS

| | | | |
|---|---|---|---|
| 2,427,439 A | | 9/1947 | Brown |
| 3,785,616 A | | 1/1974 | Moore |
| 3,834,666 A | * | 9/1974 | Keith ........................ 251/361 |
| 4,469,123 A | | 9/1984 | Merrill |
| 6,394,135 B2 | * | 5/2002 | Erickson et al. ....... 137/625.38 |
| 6,637,452 B1 | * | 10/2003 | Alman ........................ 137/244 |
| 2001/0013587 A1 | | 8/2001 | Robison et al. |

FOREIGN PATENT DOCUMENTS

CH            505323A A        3/1971

OTHER PUBLICATIONS

International Search Report dated Oct. 20, 2004.

* cited by examiner

*Primary Examiner*—John Fox
(74) *Attorney, Agent, or Firm*—Marshall, Gerstein & Borun LLP

(57) ABSTRACT

A valve assembly with a multiple-component valve plug is disclosed. The use of multiple materials in the construction of the valve plug provides different rates of thermal expansion in the axial and radial directions thereby enabling the valve plug to have thermal expansion characteristics that closely match that of the components in which it cooperates with. Specifically, the radial thermal expansion of the downstream end of the plug is closely matched to that of the retainer component which receives the downstream end of the plug. The radial thermal expansion of the upstream end of the plug is closely matched to that of the cage and seat ring to enable the plug to properly close or seat when the valve is in the closed position. The plug body or spacer tube has an axial thermal expansion that closely matches that of the cage retainer, cage or valve body, depending upon the valve design.

22 Claims, 5 Drawing Sheets

MULTIPLE MATERIAL VALVE PLUG FOR HIGH TEMPERATURE OPERATION

TECHNICAL FIELD

A new high temperature valve assembly is disclosed and, more specifically, a valve assembly with a multiple-component valve plug is disclosed which, due to the use of multiple materials in the construction thereof, provides different rates of thermal expansion in the axial and radial direction. In an embodiment, the rates of axial thermal expansion for the valve plug may also differ at the proximal and distal ends of the valve plug in addition to differences in rates of thermal expansion in the axial and radial directions.

BACKGROUND OF THE RELATED ART

Valves are commonly used to control the flow characteristics of a fluid. A conventional valve includes a valve body defining an inlet, an outlet, and a fluid flow path extending between the inlet and the outlet. A throttling element, such as a plug, is disposed in the path to control fluid flow. A stem connects the valve plug to an actuator, which moves the valve plug into and out of the flow path. A conventional valve may include a cage extending across the fluid flow path and having orifices or apertures formed therein. The plug has an outer surface sized to closely fit inside an inner cylindrical wall of the cage. As a result, the plug is slidable inside the cage between a closed position, in which the plug obstructs the orifices, and an open position, in which the plug is clear of at least a portion of the orifices. The plug can also be positioned between fully open and closed positions to control the flow rate of fluid through the cage. In a fully open position, the downstream or proximal end of the valve plug may be received in a retainer, which may be part of the cage assembly, the bonnet or the valve body.

To effect a seal between the plug and the cage, a seat ring can be disposed at the upstream or inlet end of the cage. The seat ring provides a seating surface for a seat disposed at a distal or upstream end of the valve plug. The combination of the seat on the valve plug and the seating surface on the seat ring define what is known as the trim set for the valve.

Similarly, to effect a seal between the proximal or upstream end of the valve plug and the cage retainer, the proximal end of the valve plug also typically includes some sort of seat or surface for engaging the cage retainer.

For valves used in high temperature operations, e.g., the transfer of super heated steam, the seat of the valve plug and the seat ring disposed at the upstream end of the cage may be fabricated from metal because of the inability of polymeric seals to withstand such high temperatures. Further, the valve body, the cage and the plug body or spacer tube of the plug are also typically fabricated from metal, such as alloy steels and stainless steels.

One problem associated with such high temperature valves is related to the thermal expansion of the various parts when the valves are used at high operational temperatures. Typically, the material used to construct the valve body, such as an alloy steel, will not have the same rate of thermal expansion as that of the trim parts, i.e., the plug body, seat rings, cage and seat ring, which may be fabricated from different alloy steels or stainless steels. Thus, as a metallic valve assembly operates at high temperatures, the critical dimensions of the various components will change and the valve may not open and seal properly or throttle properly. As a result, the valve does not function well and the valve stem may be prone to premature breakage and/or other failures.

One solution to this thermal expansion problem would be to fabricate all of the components from the same material. However, for larger valves operating at over 1000° F., such a strategy is not practical. For corrosion inhibition, reduced maintenance and for fabrication issues, the cage is preferably fabricated from a stainless steel. For cost considerations, the large valve body is preferably fabricated from a cheaper, alloy steel.

Depending upon the particular design, at high temperatures, the axial expansion of a valve assembly is dominated by the valve body and the radial expansion of the valve assembly is dominated by the cage, the plug body and the cage retainer, if a retainer structure is employed. Therefore, there is a need for an improved valve assembly whereby the valve plug expands axially in the same manner as the valve body and radially in the same manner as the cage and the retainer.

SUMMARY OF THE DISCLOSURE

In satisfaction of the aforenoted needs, an improved valve plug for high temperature operation is disclosed. The valve plug is fabricated from multiple materials which enable the valve plug to have an axial thermal expansion rate that is different than the radial thermal expansion rate of the plug. Further, in a refinement, the distal or upstream end of the valve plug can expand radially at a different rate than the radial expansion of the downstream or proximal end of the valve plug.

In a further refinement, various improved high temperature valve assemblies are also disclosed. In an embodiment, a two-piece cage assembly is provided that is connected to the valve body. The downstream or proximal cage component, or cage retainer, is connected to an upstream component, referred to as the cage. The cage retainer can be fabricated from an alloy steel while the cage is preferably fabricated from a stainless steel such as an austenitic stainless steel. The valve plug comprises a spacer tube having a proximal or downstream end connected to a proximal guide ring and a distal or upstream end connected to a distal guide ring. The proximal guide ring is fabricated from material having a coefficient of thermal expansion (CTE) that approximates that of the material used to fabricate the cage retainer. Further, the distal guide ring is fabricated from a material having a CTE that approximates that of the material used to fabricate the cage. Finally, the spacer tube is fabricated from a material having a CTE that approximates that of the material used to fabricate the valve body.

In an embodiment, a one-piece page cage construction is provided without a separate retainer component and therefore the proximal guide ring and distal guide ring are fabricated from a material have a CTE that approximates that of the material used to fabricate the one-piece cage component and the spacer tube is fabricated from a material with a CTE that approximates that of the valve body.

In another refinement, the bonnet of the valve assembly forms a cage retainer to which a cage structure is connected. The proximal or downstream guide ring and the spacer tube are fabricated from materials having a CTE that approximates that of the material used to fabricate the bonnet while the distal or upstream guide ring is fabricated from a material having a CTE that approximates that of the material used to fabricate the cage.

Similarly, in another embodiment, if the cage retainer is an integral part of the valve body, the spacer tube and proximal guide are fabricated from materials having a CTE that approximates that of the material used to fabricate the valve body while the distal or upstream guide ring is fabricated from the material a CTE similar to that of the material used to fabricate the cage.

Thus, a number of improved valve assemblies and valve plug designs are provided whereby the radial expansion of the proximal or downstream end of the valve plug, the axial expansion of the valve plug and the radial expansion of the distal or upstream end of the valve plug are all matched to simulate that of the cage, cage retainer, bonnet or valve body components with which they interact during operation.

Other features and advantages of the disclosed valves and valve plugs will be apparent to those skilled in the art from the following detailed description and accompanied drawings.

BRIEF DESCRIPTION OF THE DRAWINGS

The disclosed embodiments are described more or less diagrammatically in the following drawings wherein.

It should be understood that the drawings are not necessarily the scale and that the embodiments are illustrated by graphic symbols, phantom lines, diagrammatic representations and fragmentary views. In certain instances, details which are not necessary for an understanding of the disclosed valves or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
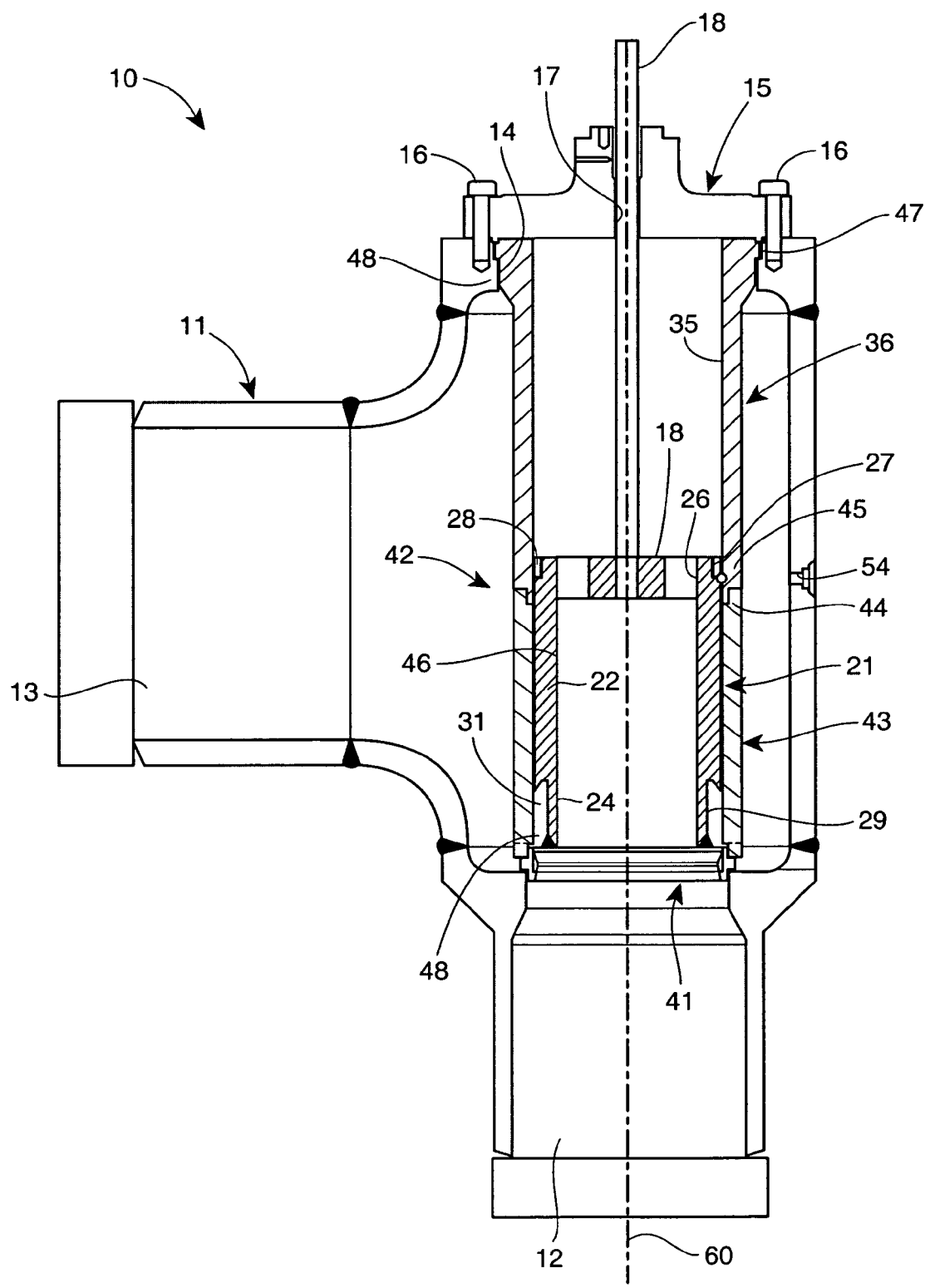
FIG. 1 is a sectional view of a valve assembly made in accordance with this disclosure, illustrating a 2-piece cage and a multi-component valve plug.

FIG. 1 illustrates a valve 10 that includes a valve body 11 designed for high temperature operation. The valve body 11 defines an inlet 12, an outlet 13 and a third opening 14 that is covered by a bonnet 15 that is connected to the valve body 11 by a plurality of fasteners shown at 16. The bonnet 15 includes an axial passageway 17 that slideably accommodates a stem 18 which, in turn, is connected to a downstream or proximal end 19 of a valve plug assembly 21. The stem 18 is connected to an actuator (not shown) for opening and closing the valve 10.

Figure 2:
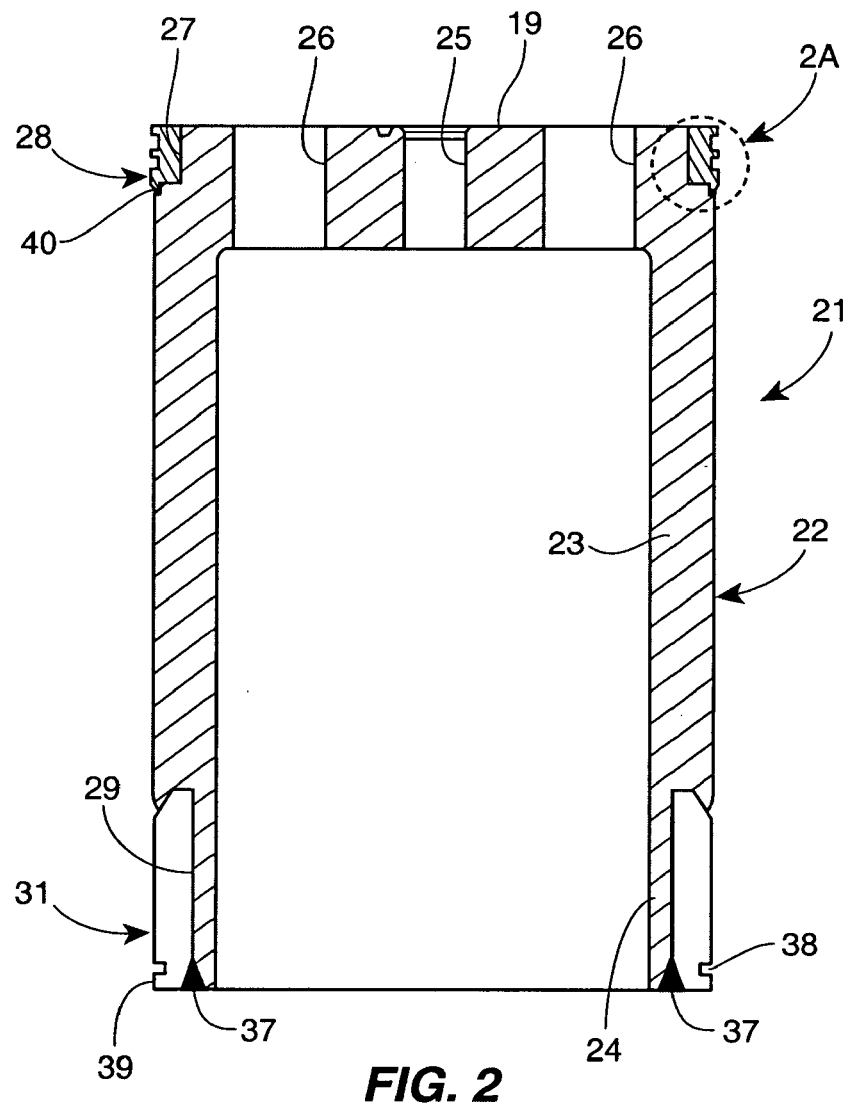
FIG. 2 is an enlarged sectional view of the valve plug shown in FIG. 1.
Figure 2A:
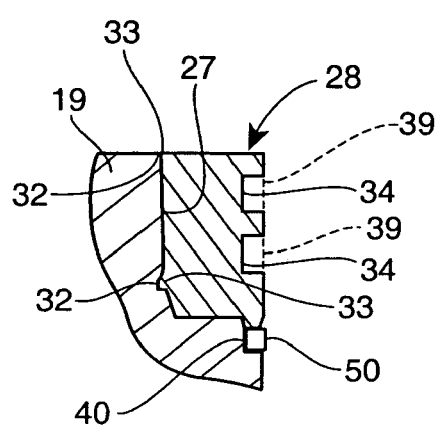
FIG. 2A is an enlarged partial sectional view of the downstream or proximal guide ring of the valve plug shown in FIG. 2.
Figure 3:
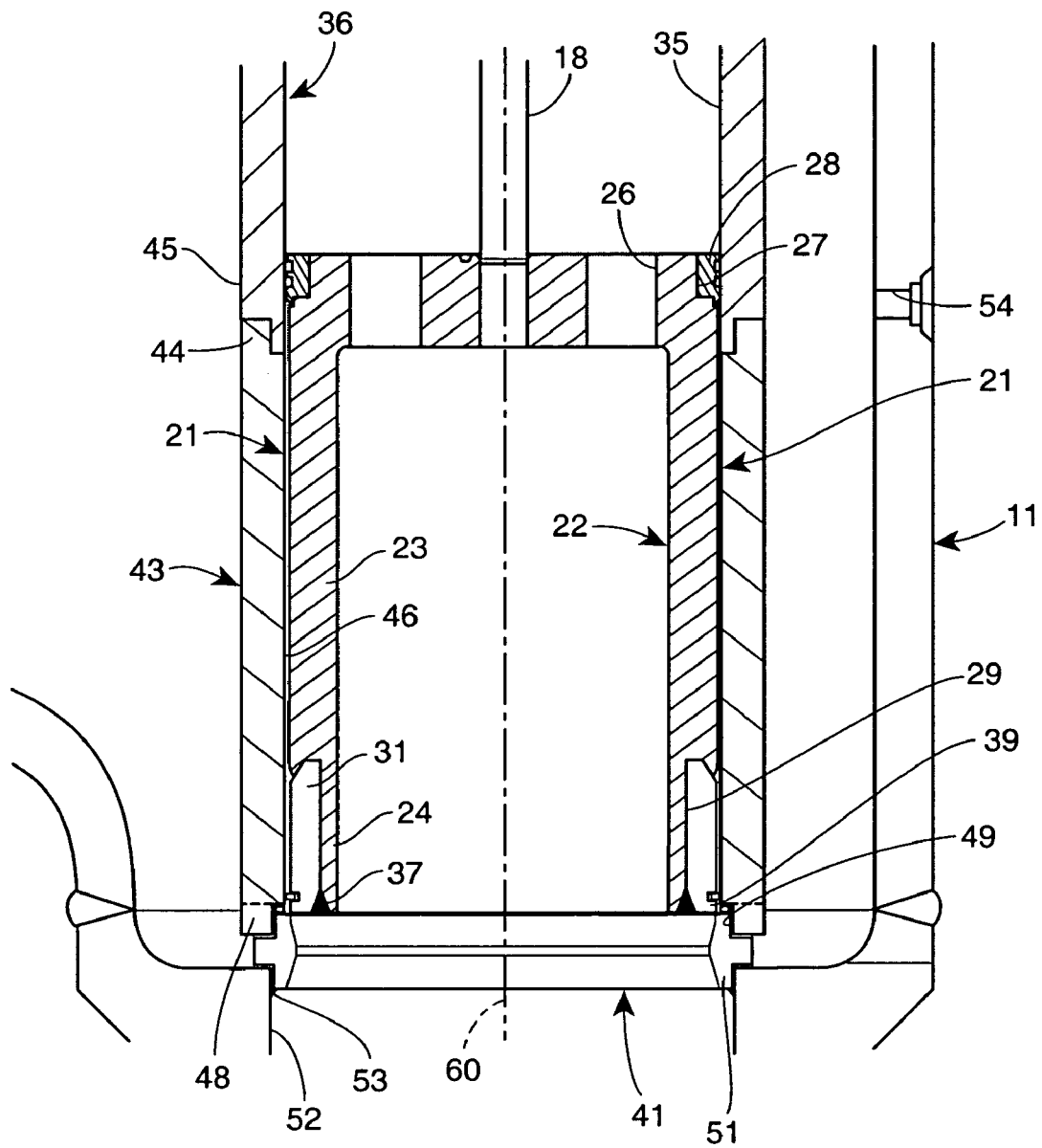
FIG. 3 is an enlarged partial sectional view of the valve assembly shown in FIG. 1.

Referring to FIGS. 1–3 together, the valve plug assembly 21 comprises a spacer tube 22 that includes the proximal or downstream end 19 and a generally cylindrical body portion 23 that terminates at an open distal or upstream end 24. The proximal end 19 includes an opening 25 for connection to the stem 18 (see FIG. 1) and a plurality of through openings shown at 26 which permit the pressure on either side of the proximal end 19 of the spacer tube 22 to be equalized. The proximal end 19 of the spacer tube 22 includes a recess 27 that accommodates a proximal guide ring 28. Further, the distal or upstream end 24 of the spacer tube 22 also includes a recess 29 that similarly accommodates a distal or upstream guide ring 31. As seen in FIG. 2A, the recess 27 includes one or more thread channels shown at 32 for accommodating a complimentary thread 33 of the proximal guide ring 28 to connect the guide ring 28 to the proximal end 19 of the spacer tube 22. The guide ring 28 may also be welded or connected to the spacer tube with suitable fasteners. Further, the proximal guide-ring 28 also includes a plurality of recesses 34 for accommodating rings shown in phantom at 39 that fictionally engage the interior surface 35 of the cage retainer 36 (see FIGS. 1 and 3). The rings 31, 28 are preferably carbon rings which are known in the art. As known to those skilled in the art, other materials, such as N07718 Nickel Alloy, stainless steel can be used. The recess 40 (not in Figures) defined by the guide ring 28 and body 23 of the spacer tube 22 accommodates a "C" seal 50 as shown in FIG. 2A.

Returning to FIG. 2, the distal or upstream guide ring 31 can be connected to the distal end 24 of the spacer tube 22 by any conventional means, such as welding, as indicated by the welds shown at 37. A peripheral slot 38 in the distal guide ring 31 is provided to define a lower annular flange 39 for frictionally engaging the seat ring 41 (see FIGS. 1 and 3) which provides a seat for the distal end 24 of the valve plug 21.

Figure 6:
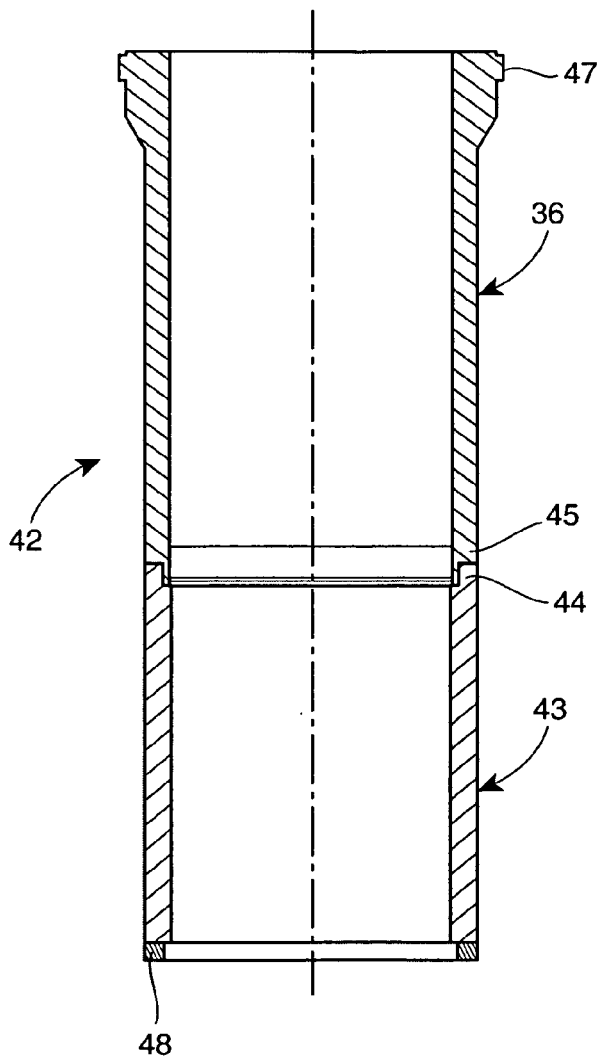
FIG. 6 is a sectional view of the 2-piece cage assembly of the valve assembly shown in FIG. 1.

Referring to FIGS. 1, 3 and 6, as noted above, the valve body 11 defines an inlet 12 and an outlet 13. Fluid is communicated through the inlet 12, through the seat ring 41 to an interior of the cage assembly 42 which, as noted above, includes the cage retainer 36 which is connected to a lower cage or simply "cage" 43. In the 2-piece cage assembly 42 shown in FIGS. 1, 3 and 6, the lower cage structure 43 comprises a permeable cylinder having a proximal end 44 connected to a distal end 45 of the cage retainer 36. The cage 43 also includes a distal end 46 that is connected to the seat ring 41 as shown in FIGS. 1 and 3.

Further, in FIGS. 1 and 3, the valve 10 is in a closed position, with the valve plug 21 blocking flow from the inlet 12 through the cage 43 to the outlet 13. In operation, to open the valve 10, the actuator (not shown) moves the stem 18 upward thereby lifting the proximal end 24 of the spacer tube 22 off of the seat ring 41 and exposing some or all of the inner surface 46 of the cage 43 to flow between the inlet 12 and outlet 13 of the valve body 10.

In contrast to the permeable cage structure 43, the cage retainer 36 is a solid, non-permeable structure. The cage retainer 36 shown in FIGS. 1 and 3 can be a separate component that is connected to the valve assembly 10 by way of the annular flange 47 that is sandwiched between the bonnet 15 and the flange 48 of the valve body 11. In contrast, the cage retainer 36 may be integrally connected or form a part of the bonnet 15 or, the cage retainer 36 may be integrally connected to or form a part of the valve body 11. As another alternative, a one-piece cage structure can be provided and therefore the permeable cage structure 43 can be connected to the valve body 11 or bonnet 15 directly without a retainer structure such as the one shown at 36 in FIGS. 1 and 3.

As shown in FIG. 6 the cage 43 may be connected to the cage retainer 36 by way of a threaded connection between the proximal end 44 of the cage 43 and the distal end 45 of the cage retainer 36. Other suitable attachment mechanisms, such as welding or frictional fit may be employed. The distal end 48 of the cage 43 mateably receives flange 49 of the seat ring 41. The connection between the distal end 46 of the cage 43 to the flange 49 of the seat ring 41 is preferably a slip fit to compensate for the effects of thermal expansion.

Figure 7:
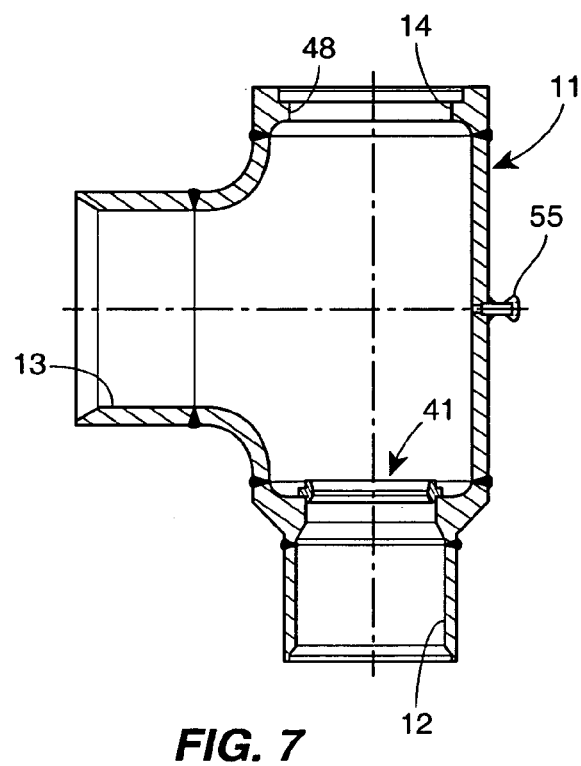
FIG. 7 is a sectional view of the valve body of valve assembly shown in FIG. 1.

As shown in FIGS. 3 and 7, the seat ring 41 is connected to the inlet 12 of the valve body 11 by way of the flange 51 being mateably received in the inlet opening 52. Again, the connection between the flange 51 of the seat ring 41 and the opening 52 of the valve body 11 can be a threaded connection or a welded connection, as exemplified by the weld bead shown at 53 or other suitable connection method. In addition, an opening 54 (FIGS. 1 and 3) may be provided in the valve body 11 for purposes of receiving a pressure release valve 55 as shown in FIG. 7.

Figure 5:
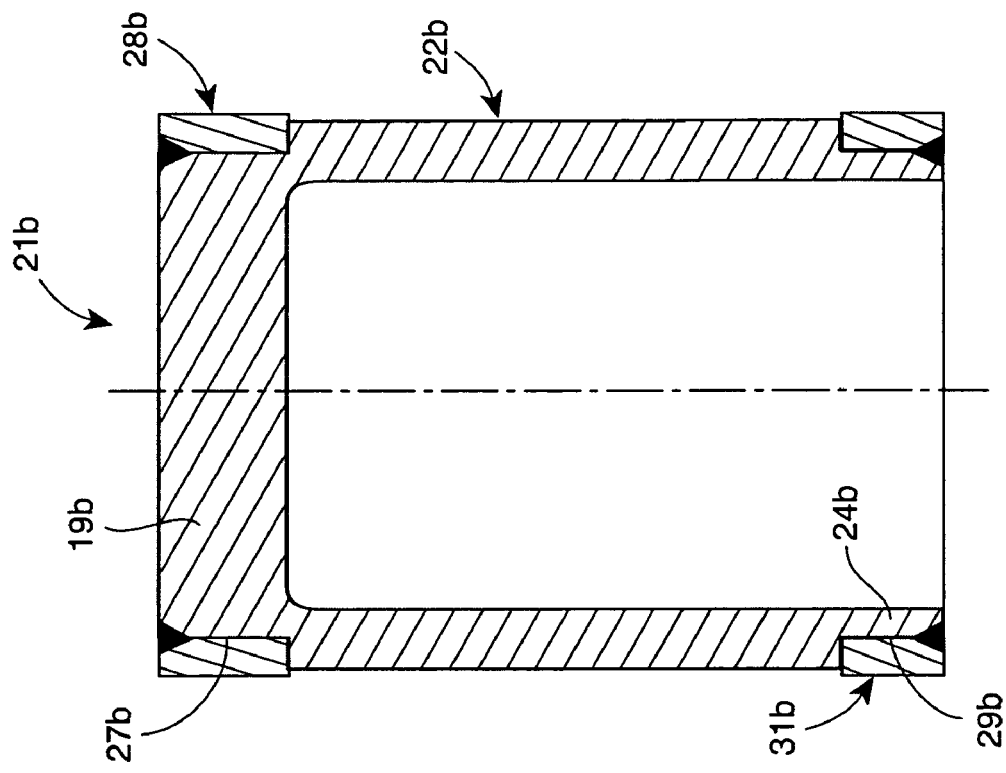
FIG. 5 is yet another alternative valve plug made in accordance with this disclosure.
Figure 4:
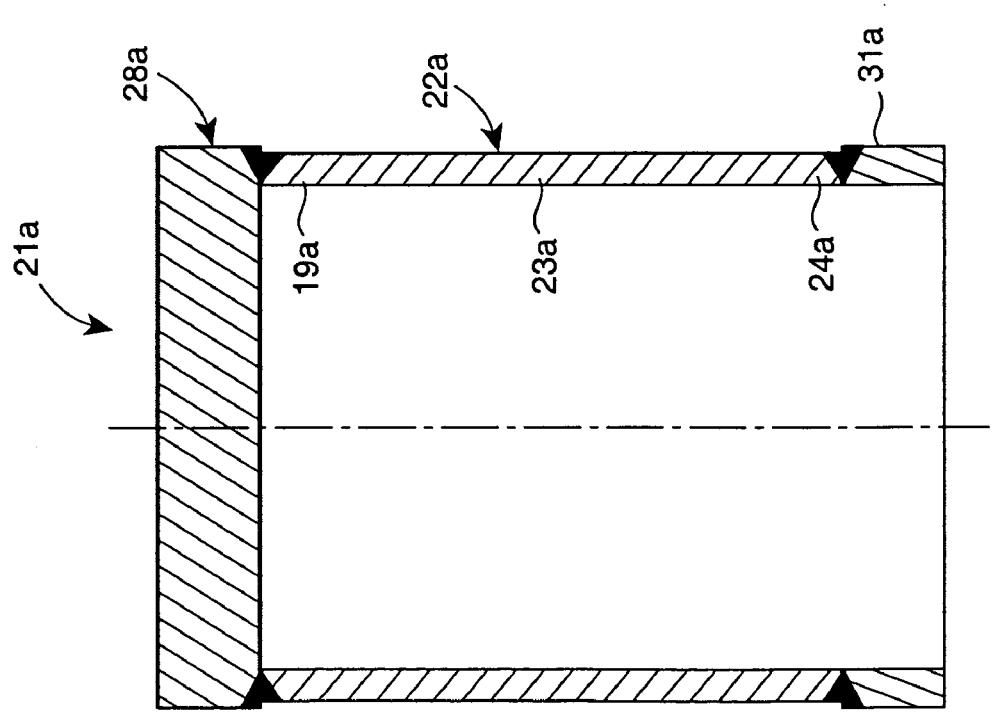
FIG. 4 is an alternative valve plug made in accordance with this disclosure.

Turning to FIGS. 4 and 5, variations of the valve plug 21 are shown at 21a and 21b, respectively. In the embodiment shown at 21a in FIG. 4, the spacer tube 22a is a generally cylindrical structure consisting essentially of the cylindrical body portion 23a that is sandwiched between the proximal guide ring 28a and distal guide ring 31a. The guide ring 28a may be welded to the proximal end 19a of the spacer tube 22a and the guide ring 31a may be welded to the distal end 24a of the spacer tube 22a as shown.

In contrast, the valve plug 21b shown in FIG. 5 includes a spacer tube structure 22b with a proximal end 19b having a recess 27b formed therein for accommodating the proximal guide ring 28b, which may be connected to the spacer tube 22b by welding as shown. Similarly, the distal end 24b of the spacer tube 22b includes a recess 29b that accommodates the distal end guide ring 31b that also may be connected to the spacer tube 22b by welding as shown.

Returning to FIG. 1, as the valve 10 is exposed to high temperatures, such as, 1000° F., various components of the valve 10 will expand both radially and axially. Specifically, the spacer tube 22 of the valve plug 21 will expand both axially, that is along the axis shown at 60 as well as radially. The cage 43 is also prone to both axial and radial expansion.

In order for the valve 10 to achieve a proper closed and sealed position and proper throttling performance as shown in FIG. 1, the radial expansion of the plug 21 must generally match the radial expansion of the cage 43. To meet this end, the plug 21 is equipped with the distal guide ring 31 which is fabricated from a material having a coefficient of thermal expansion (CTE) that closely approximates the CTE of the material used to fabricate the cage 43. In an embodiment, the cage 43 is fabricated from an austenitic stainless steel for corrosion resistance at high temperatures and for other manufacturing purposes. Thus, the distal guide ring 31 should be fabricated from a material having a CTE similar to that of the austenitic stainless steel used to fabricate the cage 43. In a preferred embodiment, both the cage 43 and the distal guide ring 31 are both fabricated from austenitic stainless steels and, most preferably, are fabricated from the same austenitic stainless steel. One suitable example of an austenitic stainless steel for the cage 43 and distal guide ring 31 for high temperature applications (i.e., 1000° F.) is S30409 SST. Another suitable example for high temperatures is S31609 SST. S31603 SST and S30403 SST austenitic stainless steels can be used for lower temperature applications.

Due to economies of scale, the larger valve body 11 is preferably fabricated from an alloy steel such as a C12A or equivalent alloy steel. Other suitable alloy steels for high temperature (i.e., >1000° F.) include WC9 and WC6 alloy steels while WCC alloy steel can be used for lower temperature applications. Additional suitable alloy steels will be apparent to those skilled in the art. These alloy steels can also be used to fabricate the spacer tube 23 and proximal guide 28 for certain designs as discussed below.

In contrast, to effect a seal between proximal end 19 of the valve plug 21 and the cage retainer 36, the proximal end 19 of the valve plug 21 must have a radial expansion that closely matches that of the cage retainer 36 as shown in FIG. 1. If the proximal end 19 of the valve plug 21 has a significantly higher CTE than the cage retainer 36, the valve 10 may not be able to open properly. If the proximal end 19 of the valve plug 21 has a significantly lower CTE than the cage retainer 36, excessive rattling, vibrating or breakage of the valve stem 18 may occur. Thus, in the embodiment illustrated, the proximal guide ring 28 should be fabricated from a material with a CTE that closely matches that of the cage retainer 36 or other valve body structure in which it is accommodated.

In the event a single cage structure is utilized (not shown), the cage 43 would be directly connected to either the valve body 11 or the bonnet 15. The valve body 11 and bonnet 15 would preferably form some sort of retainer component for mateably receiving the proximal end 19 at the spacer tube so as to permit a majority of the spacer tube 22 to be drawn through the cage 43 to permit communication between the inlet 12 and outlet 13 of the valve body 11. Thus, in such a situation, the materials selected for the guide ring 31 and cage 43 would be closely matched so that the radial expansion of the guide ring 31 closely matches the radial expansion of the cage 43. However, the proximal guide ring 28 could be fabricated from the less expensive alloy material used to fabricate the valve body 11, bonnet 15 or other retainer structure connected to either the valve body 11 or bonnet 15. Similarly, because the axial expansion of the valve 10 is dominated by the valve body 11 or retainer structure that is formed as part of the bonnet 15 or valve body 11, the spacer tube 22 can be fabricated from a less expensive alloy material so that the axial expansion of the spacer tube 22 closely matches that of the valve body 11 or retainer structure that forms a part of the valve body 11 or bonnet 15.

However, if a one-piece cage structure is provided whereby a lower section such as a perforated cage section 43 is integrally connected to an upper section such as an impermeable retainer section similar to that shown at 36 in FIG. 1, the radial expansion of both guide rings 28, 31 would then preferably match the radial expansion of the one-piece cage structure (36, 43). In such a situation, if the cage structure (36, 43) is fabricated from an austenitic stainless steel, the guide rings 28, 31 would also need to be fabricated from an austenitic stainless steel with a similar CTE. In contrast, if the proximal end 19 of the spacer tube 22 is received in a retainer structure that is integrally connected to the bonnet 15 or valve body 11, then the proximal guide ring 28 should be fabricated from a material similar to that used the valve body 11 or bonnet 15. If however, the proximal guide ring 28 is received in a section of a stainless steel cage structure, the guide ring 28 would need to be fabricated from a stainless steel having a similar CTE.

Thus, one skilled in the art will appreciate that numerous combinations and possibilities exist but it is important to know that the structures of the valve plug 21 should be fabricated with material similar to those of the components in which they interact during operation. Specifically, the distal guide ring 31 should be fabricated from a material having a CTE similar to that of the cage 43. The spacer tube 22 should be fabricated from a material with a CTE similar to that of the valve body 11. Similarly, the proximal guide ring 28 should be fabricated from a material similar to that used to fabricate the structure in which it is received, such as that of the cage retainer 36 or similar retainer structure formed by the bonnet 15 or valve body 11.

Further, more than two materials can be used to fabricate the valve plug 21. Specifically, if a two-piece cage assembly 42 is provided with a cage retainer 36 and a cage 43, then the proximal guide ring 28 would need to be fabricated from a material similar to that of the cage retainer structure 36 the spacer tube would be fabricated from a material that closely matches that of the valve body 11 and the distal guide ring 31 would be fabricated from the material that closely matches that of the cage 43. Thus, the valve plug 21 could be fabricated from two or three different materials.

Generally, the coefficient of thermal expansion of the components that need to be matched, e.g., the distal guide ring 31 and the cage 43, should be within about 10% of each other, more preferably within about 7% of each other and, most preferably within about 1% or be fabricated from the same material, thereby providing a similar CTE and therefore a similar radial or axial expansion. The differences between the coefficient of thermal expansion of alloy steels and stainless steels are substantial, generally about 35 percent. Thus, if the cage 43 is fabricated from an austenitic stainless steel the distal guide ring 31 is preferably fabricated from a stainless steel, and more preferably from an austenitic stainless steel as well. If the valve body 11 is fabricated from an alloy steel, the spacer tube 22 should be fabricated from an alloy steel as well. If a retainer structure is provided that is fabricated from an austenitic stainless steel, the proximal guide ring 28 should be fabricated from an austenitic stainless steel or a suitable stainless steel. Finally, if the retainer structure is fabricated from an alloy steel, the proximal guide ring 28 should be fabricated from an alloy steel as well. In certain designs, however, the proximal guide ring may be retained in a stainless steel structure and therefore should be fabricated from a stainless steel as well.

The foregoing detailed description has been given for clearness of understanding only, and no unnecessary limitation should be understood therefrom as modifications would be obvious to those skilled in the art.

What is claimed is:

1. A valve plug comprising:
a spacer tube comprising a proximal end, a distal end and an outer surface, the proximal end of the spacer tube being connected to a proximal guide ring and the distal end of the spacer tube being connected to a distal guide ring, the spacer tube being fabricated from a first material having a first CTE, the proximal guide ring being fabricated from a second material having a second CTE, and the distal guide ring being fabricated from a third material having a third CTE that is greater than both the first and third CTEs,
wherein the first and second materials are alloy steels and the third material is and austenitic stainless steel.

2. The valve plug of claim 1 wherein the second CTE is within about 10% of the first CTE.

3. The valve plug of claim 1 wherein the first and second materials are the same alloy steel.

4. The valve of claim 1 wherein the outer surface of the spacer tube further comprises a proximal recess that accommodates the proximal guide ring and a distal recess that accommodates the distal guide ring.

5. The valve of claim 1 wherein the proximal guide ring is welded to the proximal end of the spacer tube and the distal guide ring is welded to the distal end of the spacer tube.

6. A valve comprising:
a valve body,
a cage assembly defining a bore extending along an axis, the cage assembly comprising a cage retainer comprising a proximal end connected to the valve body and a distal end coaxially connected to a cage, the cage retainer and valve body being fabricated from a first material having a first coefficient of thermal expansion (CTE), the cage being fabricated from a second material having a second CTE,
a plug comprising a spacer tube comprising a proximal end received in the cage retainer, a distal end received in the cage and an outer surface, the proximal end of the spacer tube being connected to a proximal guide ring, the distal end of the spacer tube being connected to a distal guide ring, the outer surface of the plug and the proximal and distal guide rings being sized to fit inside the bore defined by the cage assembly and adapted for slidable movement along the axis of the bore , the spacer tube being fabricated from a third material having a third CTE within 10% of said first CTE, the proximal guide ring being fabricated from a fourth material having a fourth CTE within 10% of said first CTE, the distal guide ring being fabricated from fifth material having a fifth CTE within 10% of said second CTE,
wherein the first, third and fourth materials are alloy steels and the second and fifth materials are austenitic stainless steels.

7. The valve of claim 6 wherein the first, third and fourth materials are the same alloy steel and the second and fifth materials are the same austenitic stainless steel.

8. The valve of claim 6 wherein the outer surface of the spacer tube further comprises a proximal recess that accommodates the proximal guide ring and a distal recess that accommodates the distal guide ring.

9. The valve of claim 6 wherein the proximal guide ring is welded to the proximal end of the spacer tube and the distal guide ring is welded to the distal end of the spacer tube.

10. The valve body of claim 6 wherein the valve body is fabricated from an alloy steel.

11. A valve comprising:
a valve body fabricated from a first material having a first coefficient or thermal expansion (CTE), a cage, a seat ring and a plug,
the cage defining a bore extending along an axis, the cage comprising a proximal end connected to the valve body and a distal end mateably received in the seat ring, the cage being fabricated from a second material having a second coefficient of thermal expansion (CTE),
a plug comprising a spacer tube comprising a proximal end, a distal end and an outer surface, the proximal end of the spacer tube being connected to a proximal guide ring, the distal end of the spacer tube being connected to a distal guide ring, the outer surface of the plug and the proximal and distal guide rings being sized to fit inside the bore defined by the cage and adapted for slidable movement along the axis of the bore , the spacer tube being fabricated from a third material having a third CTE within 10% of said first CTE, the proximal and distal guide rings being fabricated from a fourth material having a fourth CTE within 10% of said second CTE,
wherein the second and fourth materials are austenitic stainless steels.

12. The valve of claim 11 wherein the first and third materials are the same and are an alloy steel.

13. The valve of claim 11 wherein the outer surface of the spacer tube further comprises a proximal recess that accommodates the proximal guide ring and a distal recess that accommodates the distal guide ring.

14. The valve of claim 11 wherein the proximal guide ring is welded to the proximal end of the spacer tube and the distal guide ring is welded to the distal end of the spacer tube.

15. A valve comprising:
a valve body, a bonnet, a cage, a seat ring and a plug,
the valve body comprising an inlet, an outlet and a third opening covered by the bonnet,
the bonnet being secured to the valve body at the third opening and comprising a cylindrical retainer having an open distal end connected to a proximal end of the cage, the bonnet and valve body being fabricated from a first material having a first coefficient of thermal expansion (CTE),
the cage and cylindrical retainer of the bonnet defining a bore extending along an axis, the cage further comprising a distal end coaxially connected to the seat ring, the seat ring connected to the inlet of valve body, the cage being fabricated from a second material having a second coefficient of thermal expansion (CTE),
a plug comprising a spacer tube comprising a proximal end, a distal end and an outer surface, the proximal end of the spacer tube being connected to a proximal guide ring, the distal end of the spacer tube being connected to a distal guide ring, the outer surface of the plug and the proximal and distal guide rings being sized to fit inside the bore defined by the cage and cylindrical retainer of the bonnet and adapted for slidable movement along the axis of the bore, the spacer tube being fabricated from a third material having a third CTE within 10% of said first CTE, the proximal guide ring being fabricated from a fourth material having a fourth CTE within 10% of said first CTE and the distal guide ring being fabricated from a fifth material having a fifth CTE within 10% of said second CTE,
wherein the first, third and fourth materials are alloy steels and the second and fifth materials are austenitic stainless steels.

16. The valve of claim 15 wherein the first, third and fourth materials are the same alloy steel and the second and fifth materials are the same austenitic stainless steel.

17. The valve of claim 15 wherein the outer surface of the spacer tube further comprises a proximal recess that accommodates the proximal guide ring and a distal recess that accommodates the distal guide ring.

18. The valve of claim 14 wherein the proximal guide ring is welded to the proximal end of the spacer tube and the distal guide ring is welded to the distal end of the spacer tube.

19. A valve comprising:
a valve body, a cage, a seat ring and a plug,
the valve body comprising an inlet, an outlet and a cylindrical cage retainer disposed therebetween, the cylindrical cage retainer having an open distal end axially connected to a proximal end of the cage, the valve body being fabricated from a first material having a first coefficient of thermal expansion (CTE),
the cage and cylindrical retainer of the valve body defining a bore extending along an axis, the cage further comprising a distal end coaxially connected to the seat ring, the seat ring connected to the inlet of valve body, the cage being fabricated from a second material having a second coefficient of thermal expansion (CTE),
a plug comprising a spacer tube comprising a proximal end, a distal end and an outer surface, the proximal end of the spacer tube being connected to a proximal guide ring, the distal end of the spacer tube being connected to a distal guide ring, the outer surface of the plug and the proximal and distal guide rings being sized to fit inside the bore defined by the cage and cylindrical retainer of the valve body and adapted for slidable movement along the axis of the bore, the spacer tube being fabricated from a third material having a third CTE within 10% of said first CTE, the proximal guide ring being fabricated from a fourth material having a fourth CTE within 10% of said first CTE and the distal guide ring being fabricated from a fifth material having a fifth CTE within 10% of said second CTE,
wherein the first, third and fourth materials are alloy steels and the second and fifth materials are austenitic stainless steels.

20. The valve of claim 19 wherein the first, third and fourth materials are the same alloy steel and the second and fifth materials are the same austenitic stainless steel.

21. The valve of claim 19 wherein the outer surface of the spacer tube further comprises a proximal recess that accommodates the proximal guide ring and a distal recess that accommodates the distal guide ring.

22. The valve of claim 19 wherein the proximal guide ring is welded to the proximal end of the spacer tube and the distal guide ring is welded to the distal end of the spacer tube.

* * * * *

UNITED STATES PATENT AND TRADEMARK OFFICE
CERTIFICATE OF CORRECTION

PATENT NO.        : 6,997,211 B2  
APPLICATION NO. : 10/613300  
DATED               : February 14, 2006  
INVENTOR(S)       : Paul T. Alman et al.

It is certified that error appears in the above-identified patent and that said Letters Patent is hereby corrected as shown below:

In the Specification:

At Column 2, line 49, please delete "page".

At Column 3, line 2, please insert -- having -- after "material".

At Column 4, line 18, please insert -- and -- before "stainless".

At Column 6, line 53, please insert -- to fabricate -- after "used".

In the Claims:

In claim 1, at Column 7, line 55, please delete "and" and insert -- an --.

In claim 6, at Column 8, line 24, please insert -- a -- before "fifth"..

Signed and Sealed this

Seventh Day of August, 2007

JON W. DUDAS  
*Director of the United States Patent and Trademark Office*